(12) United States Patent
Kwon

(10) Patent No.: US 10,971,066 B2
(45) Date of Patent: Apr. 6, 2021

(54) DISPLAY DEVICE AND DRIVING METHOD THEREOF

(71) Applicant: SAMSUNG DISPLAY CO., LTD., Yongin-si (KR)

(72) Inventor: Jin Ho Kwon, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/043,856

(22) Filed: Jul. 24, 2018

(65) Prior Publication Data

US 2019/0114968 A1  Apr. 18, 2019

(30) Foreign Application Priority Data

Oct. 17, 2017  (KR) ......................... 10-2017-0134511

(51) Int. Cl.
*G09G 3/3258* (2016.01)
*H04N 13/167* (2018.01)

(52) U.S. Cl.
CPC ......... *G09G 3/3258* (2013.01); *H04N 13/167* (2018.05); *G09G 2310/08* (2013.01); *G09G 2320/0626* (2013.01)

(58) Field of Classification Search
CPC ......... G09G 3/3258; G09G 2320/0626; G09G 2310/08; G09G 3/3233; G09G 5/006; G09G 5/008; G09G 2370/00; G09G 2370/08; G09G 2340/06; G09G 2320/045; G09G 2320/0295; G09G 2320/029; G09G 3/2096; G09G 3/2003; G09G 3/3291; G09G 2340/02; G09G 2320/0693; G09G 2370/12; G09G 2350/00; G09G 2310/027; G09G 2310/0297

See application file for complete search history.

(56) References Cited

U.S. PATENT DOCUMENTS

| | | | | |
|---|---|---|---|---|
| 5,784,037 | A | * | 7/1998 | Inoue ...................... G06F 3/147 345/87 |
| 9,036,081 | B2 | | 5/2015 | Ozawa |
| 9,524,693 | B2 | | 12/2016 | Hong et al. |
| 2001/0002124 | A1 | * | 5/2001 | Mamiya ................. G09G 5/005 345/418 |
| 2003/0032392 | A1 | * | 2/2003 | Suzuki ................... H04N 7/083 455/39 |
| 2006/0227710 | A1 | * | 10/2006 | Honda ................... G09G 5/006 370/235 |
| 2007/0011552 | A1 | * | 1/2007 | Altmann ............... H04L 1/0061 714/746 |

(Continued)

FOREIGN PATENT DOCUMENTS

| | | |
|---|---|---|
| KR | 1020140056775 A | 5/2014 |
| KR | 101633120 B1 | 6/2016 |
| KR | 1020170016131 A | 2/2017 |

*Primary Examiner* — Md Saiful A Siddiqui
(74) *Attorney, Agent, or Firm* — Cantor Colburn LLP

(57) ABSTRACT

A display device includes: a processor; and a display panel which receives an image signal, an image control signal and an image processing signal from the processor and displays an image corresponding to the image signal corrected based on the image processing signal, where the display panel time-divisionally receives the image signal and the image processing signal through a same channel as each other.

10 Claims, 3 Drawing Sheets

(56) References Cited

U.S. PATENT DOCUMENTS

| | | | |
|---|---|---|---|
| 2007/0216630 A1* | 9/2007 | Liao | G09G 3/3611 |
| | | | 345/100 |
| 2009/0135304 A1* | 5/2009 | Inoue | G09G 3/3208 |
| | | | 348/712 |
| 2010/0085375 A1* | 4/2010 | Chung | G09G 3/3406 |
| | | | 345/589 |
| 2016/0217724 A1* | 7/2016 | Kim | G09G 5/395 |
| 2017/0193877 A1* | 7/2017 | Lee | G09G 3/2003 |
| 2019/0174027 A1* | 6/2019 | Lv | H04N 5/211 |

\* cited by examiner

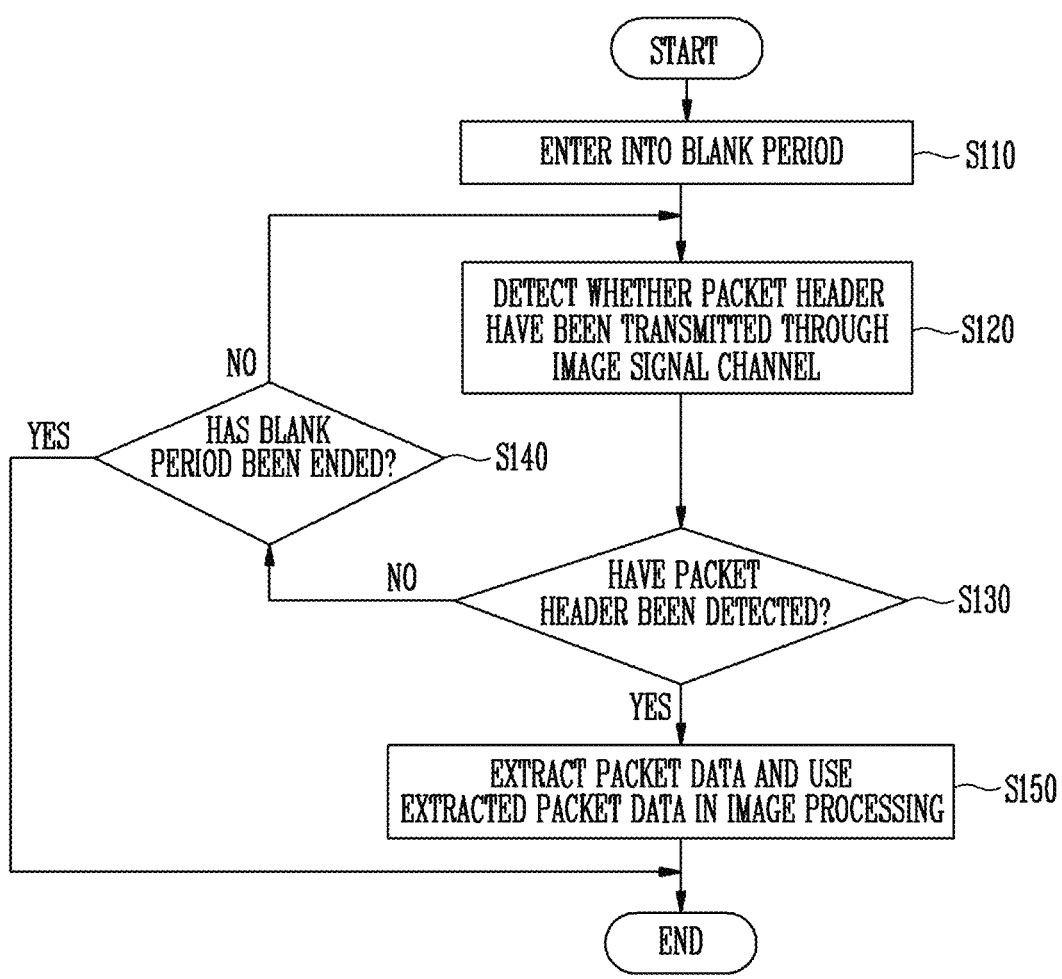

DISPLAY DEVICE AND DRIVING METHOD THEREOF

The application claims priority to Korean Patent Application No. 10-2017-0134511, filed on Oct. 17, 2017, and all the benefits accruing therefrom under 35 U.S.C. § 119, the content of which in its entirety is herein incorporated by reference.

BACKGROUND

1. Field

Embodiments of the disclosure relate to a display device and a driving method thereof.

2. Description of the Related Art

With the development of information technologies, demand of a display device, which is a connection medium between a user and information, has been increased in various fields. Accordingly, display devices such as a liquid crystal display device and an organic light emitting display device are increasingly being used.

A display device may display a target image to a user by writing a data voltage for expressing a target gray scale in each pixel, and allowing an organic light emitting diode to emit light or controlling orientation of liquid crystals, corresponding to the data voltage.

The display device may correct an image signal based on an image processing signal and write a data voltage corresponding to the corrected image signal to each pixel. For example, by using an image processing signal including brightness information, the display device may correct an image signal to increase the luminance of an excessively dark frame, and correct an image to decrease an excessively bright frame.

However, the luminance of a current frame may be corrected based on brightness information generated by analyzing a previous frame to provide a time for generating such an image processing signal.

SUMMARY

A correction method by analyzing a previous may be effectively performed when the correlation between the previous frame and the current frame is high. However, when the correlation between the previous frame and the current frame is low, such as a case where a scene change occurs, such a correction method may be not effectively performed.

In addition, manufacturing cost of a display device using such a method may increase because a separate frame memory is typically used to store information on the previous frame.

Embodiments provide a display device capable of correcting an image signal for a current frame, using an image processing signal for the current frame, and a driving method of the display device.

According to an embodiment of the disclosure, a display device includes: a processor; and a display panel which receives an image signal, an image control signal, and an image processing signal from the processor and displays an image corresponding to the image signal corrected based on the image processing signal, where the display panel time-divisionally receives the image signal and the image processing signal through a same channel as each other.

In an embodiment, the display panel may receive the image processing signal in a blank period except an active period in which the image signal is received.

In an embodiment, the display panel may include: a packet header detector coupled to the processor through a data enable signal channel and a first image signal channel; a packet data extractor coupled to the processor through at least another image signal channel; and an image processor which corrects the image signal based on the image processing signal.

In an embodiment, the display panel may receive a data enable signal having a first level through the data enable signal channel during the active period, and receive the data enable signal having a second level through the data enable signal channel during the blank period.

In an embodiment, the packet header detector may detect whether a packet header of the image processing signal has been transmitted through the first image signal channel while the data enable signal having the second level is being received.

In an embodiment, the packet header detector may activate the packet data extractor when the packet header is detected.

In an embodiment, the activated pack data extractor may extract packet data corresponding to the packet header from the image processing signal through the at least another image signal channel.

In an embodiment, the image processor may correct the image signal based on the extracted packet data.

In an embodiment, the display panel may include: a pixel unit including a plurality of pixels; a data driver which supplies a data voltage to the pixel unit; a scan driver which supplies a scan signal to the pixel unit; and a timing controller which transmits a corrected image signal to the data driver and transmits corresponding control signals to the data and scan drivers, respectively.

In an embodiment, the timing controller may include the packet header detector, the packet data extractor, and the image processor.

In an embodiment, the image control signal may include a vertical synchronization signal and a horizontal synchronization signal.

According to another embodiment of the disclosure, a method for driving a display device including a processor and a display panel includes: transmitting an image signal from the processor to the display panel through a first image signal channel and at least another image signal channel during an active period; transmitting an image processing signal from the processor to the display panel through the first image signal channel and the at least another image signal channel during a blank period except the active period; and displaying, by the display panel, an image corresponding to the image signal corrected based on the image processing signal.

In an embodiment, the method may further include transmitting a data enable signal having a first level from the processor to the display panel through a data enable signal channel during the active period; and transmitting the data enable signal having a second level from the processor to the display panel through the data enable signal channel during the blank period.

In an embodiment, the method may further include detecting, by the display panel, whether a packet header of the image processing signal has been transmitted through the first image signal channel while the data enable signal having the second level is being received.

In an embodiment, the method may further include extracting, by the display panel, packet data corresponding to the packet header from the image processing signal through the at least another image signal channel when the packet header is detected.

In an embodiment, the method may further include correcting, by the display panel, the image signal based on the extracted packet data.

BRIEF DESCRIPTION OF THE DRAWINGS

The above and other features of the invention will become more apparent by describing in further detail exemplary embodiments thereof with reference to the accompanying drawings, in which:

FIG. 4 is a diagram illustrating a driving method of the display device according to an embodiment of the disclosure.

DETAILED DESCRIPTION

Figure 1:
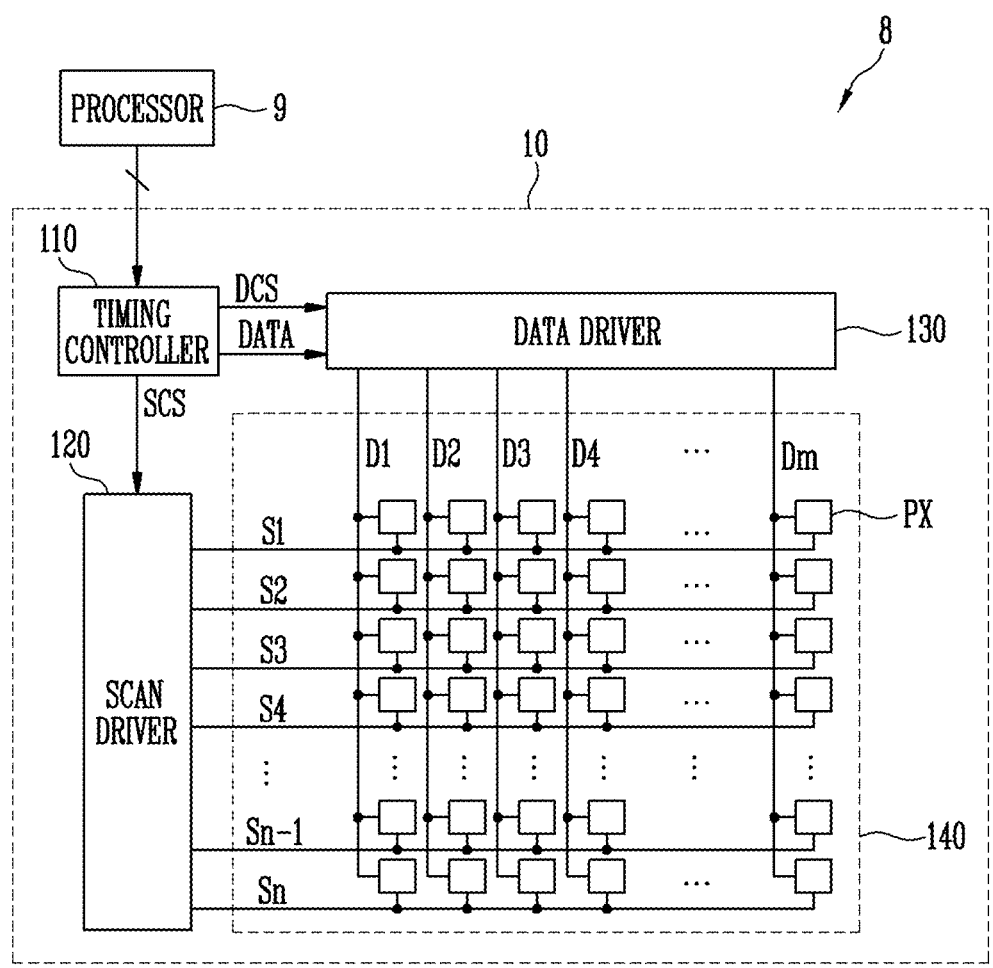
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

FIG. 1 is a diagram illustrating a display device according to an embodiment of the disclosure.

Referring to FIG. 1, an embodiment of the display device 8 includes a processor 9 and a display panel 10.

The processor 9 may be a general-purpose processing device. In one embodiment, for example, the processor 9 may be an application processor ("AP") of a mobile phone or a processing device of another display device.

The processor 9 may transmit signals used for image display to the display panel 10. In an embodiment, as shown in FIG. 1, the signals for image display are transmitted from the processor 9 to a timing controller 110, but not being limited thereto. Alternatively, the signals for image display may be transmitted to an integrated circuit ("IC") in which the timing controller 110 and a data driver 130 are integrated, or to the data driver 130.

For convenience of description, an embodiment in which the processor 9 transmits the signals for image display to the timing controller 110 will be described with reference to FIG. 2. In such an embodiment, the signals for image display may include a data enable signal, a vertical synchronization signal, a horizontal synchronization signal, a first image signal, a second image signal, a third image signal, and an image processing signal.

The display panel 10 may include the timing controller 110, a scan driver 120, and the data driver 130. The display panel 10 receives an image signal, an image control signal, and an image processing signal from the processor 9, and displays an image corrected based on the image processing signal. In an embodiment, the display panel 10 may time-divisionally receive the image signal and the image processing signal through a same channel as each other or a single channel.

The timing controller 110 transmits an image signal DATA corrected using the data enable signal, the vertical synchronization signal, the horizontal synchronization signal, the first image signal, the second image signal, the third image signal and the image processing signal, and transmits corresponding control signals DCS and SCS to the data and scan drivers 130 and 120, respectively.

The data driver 130 supplies a data voltage to a pixel unit 140. In an embodiment, the data driver 130 may apply a plurality of data voltages generated based on a data control signal DCS and the corrected image signal DATA to a plurality of data lines D1, D2, D3, D4, . . . , and Dm.

The scan driver 120 supplies a scan signal to the pixel unit 140. In an embodiment, the scan driver 120 may supply a plurality of scan signals to a plurality of scan lines S1, S2, S3, S4, . . . , Sn−1, and Sn in response to a scan control signal SCS. In one embodiment, for example, the scan driver 120 may sequentially supply the plurality of scan signals to the plurality of scan lines S1, S2, S3, S4, . . . , Sn−1 and Sn, respectively.

The pixel unit 140 includes a plurality of pixels PX. Each of the plurality of pixels PX may emit light with a gray scale corresponding to a data voltage applied thereto. Each of the plurality of pixels PX may be coupled to a corresponding data line D1, D2, D3, D4, . . . , or Dm and a corresponding scan line S1, S2, S3, S4, . . . , Sn−1, or Sn, and be supplied with a data voltage and a scan signal through the corresponding data line D1, D2, D3, D4, . . . , or Dm and the corresponding scan line S1, S2, S3, S4, . . . , Sn−1, or Sn. In an embodiment, where the display device 8 is an organic light emitting display device, each pixel PX may include an organic light emitting diode. In an embodiment, where the display device 8 is a liquid crystal display device, each pixel PX may include a liquid crystal layer.

Figure 2:
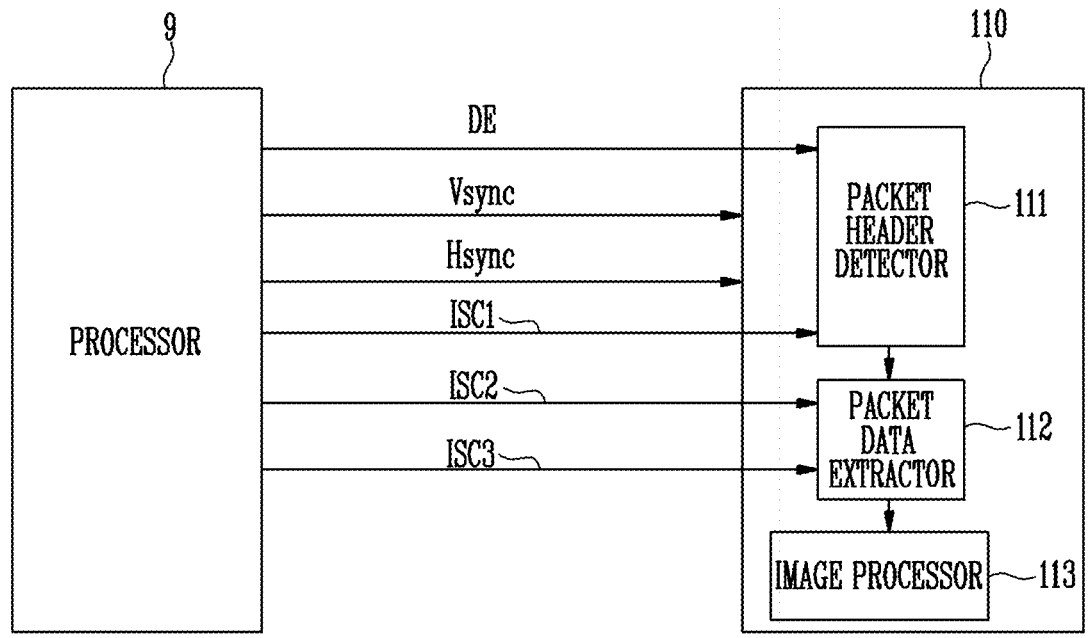
FIG. 2 is a diagram illustrating a processor and a timing controller according to an embodiment of the disclosure.
Figure 3:
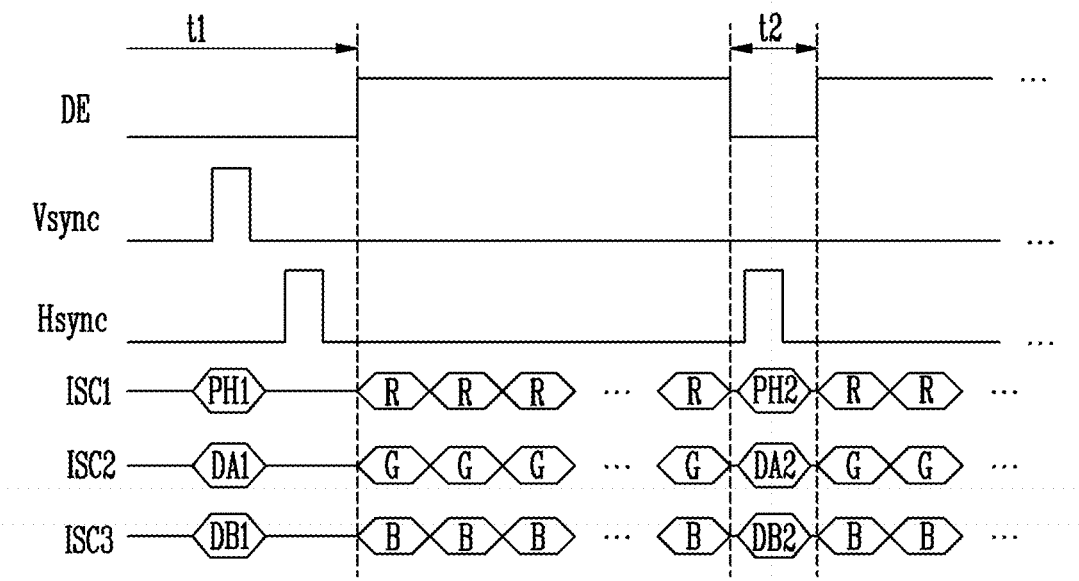
FIG. 3 is a signal timing diagram illustrating a data enable signal, a vertical synchronization signal, a horizontal synchronization signal, a first image signal, a second image signal, a third image signal, and an image processing signal according to an embodiment of the disclosure.

FIG. 2 is a diagram illustrating a processor and a timing controller according to an embodiment of the disclosure. FIG. 3 is a signal timing diagram illustrating a data enable signal, a vertical synchronization signal, a horizontal synchronization signal, a first image signal, a second image signal, a third image signal, and an image processing signal according to an embodiment of the disclosure.

Referring to FIG. 2, the processor 9 and the timing controller 110 are coupled to each other through a plurality of channels. The plurality of channels may include a data enable signal channel, a vertical synchronization signal channel, a horizontal synchronization signal channel, a first image signal channel ISC1, a second image signal channel ISC2, and a third image signal channel ISC3. A data enable signal DE, a vertical synchronization signal Vsync, a horizontal synchronization signal Hsync, a first image signal R, a second image signal G, and a third image signal B may be transmitted through the respective channels.

The data enable signal DE may be a signal informing that the image signals R, G, and B are transmitted through the image signal channels ISC1, ISC2, and ISC3 when the data enable signal DE has a first level. The vertical synchronization signal Vsync may be a signal informing that a frame is changed when the vertical synchronization signal Vsync has the first level. The horizontal synchronization signal Hsync may be a signal informing that a pixel row constituting the frame is changed when the horizontal synchronization signal Hsync has the first level.

In an embodiment of the disclosure, the first image signal R may be transmitted through the first image signal channel ISC1 in an active period, and packet headers PH1 and PH2 of an image processing signal may be transmitted through the first image signal channel ISC1 in a blank period except the active period.

In such an embodiment, the second image signal G may be transmitted through the second image signal channel ISC2 in the active period, and packet data DA1 and DA2 of the image processing signal may be transmitted through the second image signal channel ISC2 in the blank period.

In such an embodiment, the third image signal B may be transmitted through the third image signal channel ISC3 in the active period, and packet data DB1 and DB2 of the image processing signal may be transmitted through the third image signal channel ISC3 in the blank period.

In an embodiment, as shown in FIG. 2, the timing controller 110 may include a packet header detector 111, a packet data extractor 112, and an image processor 113.

The packet header detector 111 may be electrically coupled to the processor 9 through the data enable signal channel and the first image signal channel ISC1.

The packet data extractor 112 may be electrically coupled to the processor 9 through at least another image signal channel ISC2 and ISC3. In an embodiment, the packet data extractor 112 is coupled to two image signal channels ISC2 and ISC3. However, in an alternative embodiment, where the data size of the image processing signal is relatively small, only one of the image signal channels ISC2 and ISC3 may be coupled to the packet data extractor 112.

The image processor 113 may correct an image signal, using the image processing signal. In one embodiment, for example, the image processing signal may include brightness information on a current frame.

The packet header detector 111 may receive the data enable signal DE having the first level through the data enable signal channel in the active period, and receive the data enable signal DE having a second level in the blank period. In an embodiment, as shown in FIG. 3, the data enable signal DE having a low level is received in the blank period t1 and t2 and the data enable signal DE having a high level is received in the active period, but not being limited thereto. Alternative, the low level and the high level may be reversed according to device configurations.

The packet header detector 111 may detect whether the packet headers PH1 and PH2 of the image processing signal have been transmitted through the first image signal channel ISC1 while the data enable signal DE having the second level is being received. In such an embodiment, the packet header detector 111 may activate the packet data extractor 112 when the packet headers PH1 and PH2 are detected.

When the packet data extractor 112 is activated, the packet data extractor 112 may extract packet data DA1, DA2, DB1, and DB2 corresponding to the packet headers PH1 and PH2 through at least another image signal channel ISC2 and ISC3. In an embodiment, a first packet header PH1 of the packet headers PH1 and PH2 and first packet data DA1 and DB1 of the extracted packet data DA1, DA2, DB1, and DB2 may constitute one image processing signal, and a second packet header PH2 of the packet headers PH1 and PH2 and second packet data DA2 and DB2 of the extracted packet data DA1, DA2, DB1, and DB2 may constitute another image processing signal.

The image processor 113 may correct an image signal, using the extracted packet data DA1, DA2, DB1, and DB2.

Thus, in such an embodiment, the display panel 10 receives an image processing signal for a current frame during the blank period, so that image processing on the current frame may be immediately performed. Further, in such an embodiment where storing information on a previous frame is not performed, manufacturing cost may be decreased by omitting a frame memory for the previous frame.

FIG. 4 is a diagram illustrating a driving method of the display device according to an embodiment of the disclosure.

In an embodiment of a driving method of the display device, when the display device enters into the blank period (S110), whether the packet headers PH1 and PH2 of the image processing signal have been transmitted through the first image signal channel ISC1 is detected (S120). In one embodiment, for example, the packet header detector 111 detects whether the packet headers PH1 and PH2 have been transmitted through the first image signal channel ISC1.

When the packet headers PH1 and PH2 are detected (S130), packet data DA1, DA2, DB1, and DB2 corresponding to the packet headers PH1 and PH2 are extracted. In one embodiment, for example, the packet header detector 111 activates the packet data extractor 112 to extract packet data DA1, DA2, DB1, and DB2 corresponding to the packet headers PH1 and PH2 from the image processing signal through at least another image signal channel ISC2 and ISC3. The extracted packet data DA1, DA2, DB1, and DB2 may be used in image processing of the current frame (S150).

When the blank period is ended in a state in which the packet headers PH1 and PH2 are not detected (S130 and S140), there is no room for the image processing signal to be transmitted, and hence detecting the packet headers PH1 and PH2, e.g., the operation of the packet header detector 111, is stopped. When the blank period is not ended (S140), the packet header detector 111 continuously detects whether the packet headers PH1 and PH2 have been transmitted through the first image signal channel ISC1 (S120).

The packet header detector 111, the packet data extractor 112 and the image processor 113, which are described above, may be variously configured by combining digital logic circuits and analog circuits.

In embodiments of the display device and the driving method thereof according to the disclosure, an image signal for a current frame may be effectively corrected using an image processing signal for the current frame.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
   a processor; and
   a display panel which receives an image signal, an image control signal, and an image processing signal from the processor and displays an image corresponding to the image signal corrected based on the image processing signal
   wherein the display panel time-divisionally receives the image signal and the image processing signal through a same plurality of image signal channels as each other based on a level of a same single data enable signal,
   wherein the display panel receives a packet header of the image processing signal through a first image signal channel among the plurality of image signal channels, and
   wherein the display panel receives a packet data of the image processing signal through at least another image signal channel among the plurality of image signal channels,
   wherein the display panel receives the image processing signal in a blank period except an active period in which the image signal is received,
   wherein the display panel comprises:
   a packet header detector coupled to the processor through a data enable signal channel and the first image signal channel,
   a packet data extractor coupled to the processor through the at least another image signal channel, and
   an image processor which corrects the image signal based on the image processing signal,
   wherein the display panel receives the data enable signal having a first level through the data enable signal channel during the active period, and receives the data enable signal having a second level through the data enable signal channel during the blank period, and
   wherein the packet header detector detects whether the packet header of the image processing signal has been transmitted through the first image signal channel while the data enable signal having the second level is being received.

2. The display device of claim 1, wherein the packet header detector activates the packet data extractor when the packet header is detected.

3. The display device of claim 2, wherein the activated packet data extractor extracts the packet data corresponding to the packet header from the image processing signal through the at least another image signal channel.

4. The display device of claim 3, wherein the image processor corrects the image signal based on the extracted packet data.

5. The display device of claim 4, wherein the display panel includes:
   a pixel unit including a plurality of pixels;
   a data driver which supplies a data voltage to the pixel unit;
   a scan driver which supplies a scan signal to the pixel unit; and
   a timing controller which transmits a corrected image signal to the data driver and transmits corresponding control signals to the data and scan drivers, respectively.

6. The display device of claim 5, wherein the timing controller comprises the packet header detector, the packet data extractor, and the image processor.

7. The display device of claim 1, wherein the image control signal includes a vertical synchronization signal and a horizontal synchronization signal.

8. A method for driving a display device including a processor and a display panel, the method comprising:
   transmitting an image signal from the processor to the display panel through a plurality of image signal channels during an active period;
   transmitting an image processing signal from the processor to the display panel through the plurality of image signal channels during a blank period except the active period;
   displaying, by the display panel, an image corresponding to the image signal corrected based on the image processing signal,
   transmitting the data enable signal having a first level from the processor to the display panel through a data enable signal channel during the active period;
   transmitting the data enable signal having a second level from the processor to the display panel through a data enable signal channel during the blank period;
   detecting, by the display panel, whether the packet header of the image processing signal has been transmitted through the first image signal channel while the data enable signal having the second level is be received,
   wherein the image signal and the image processing signal are transmitted through the same plurality of image signal channels as each other based on a level of a same single data enable signal,
   wherein the display panel receives a packet header of the image processing signal through a first image signal channel among the plurality of image signal channels, and
   wherein the display panel receives a packet data of the image processing signal through at least another image signal channel among the plurality of image signal channels.

9. The method of claim 8, further comprising:
   extracting, by the display panel, the packet data corresponding to the packet header from the image processing signal through the at least another image signal channel when the packet header is detected.

10. The method of claim 9, further comprising:
    correcting, by the display panel, the image signal based on the extracted packet data.

* * * * *